May 8, 1934.  C. M. TUTTLE ET AL  1,957,863
APPARATUS FOR HANDLING PHOTOGRAPHIC STRIP MATERIAL
Filed Nov. 6, 1931  3 Sheets-Sheet 1

Inventors:
Clifton M. Tuttle & William C. Henry,
By Newton M. Perrin
George A. Gillette, Jr.
Attorneys.

May 8, 1934. C. M. TUTTLE ET AL 1,957,863
APPARATUS FOR HANDLING PHOTOGRAPHIC STRIP MATERIAL
Filed Nov. 6, 1931  3 Sheets-Sheet 2
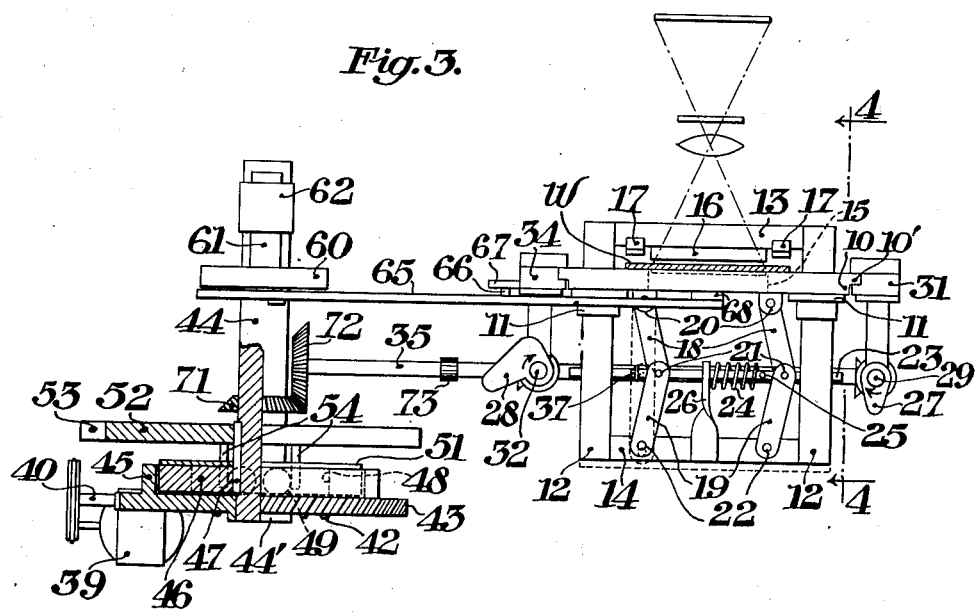
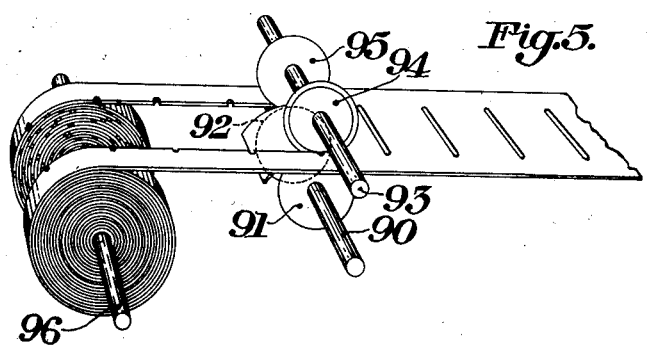
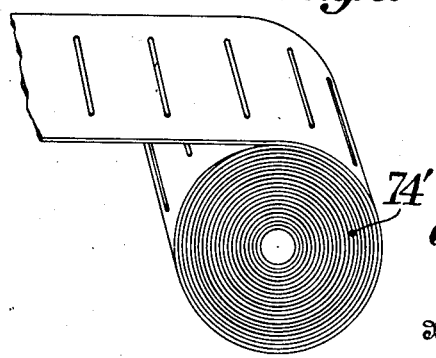
Inventors:
Clifton M. Tuttle & William C. Henry
By Newton M. Perrins
George A. Gillette, Jr.
Attorneys

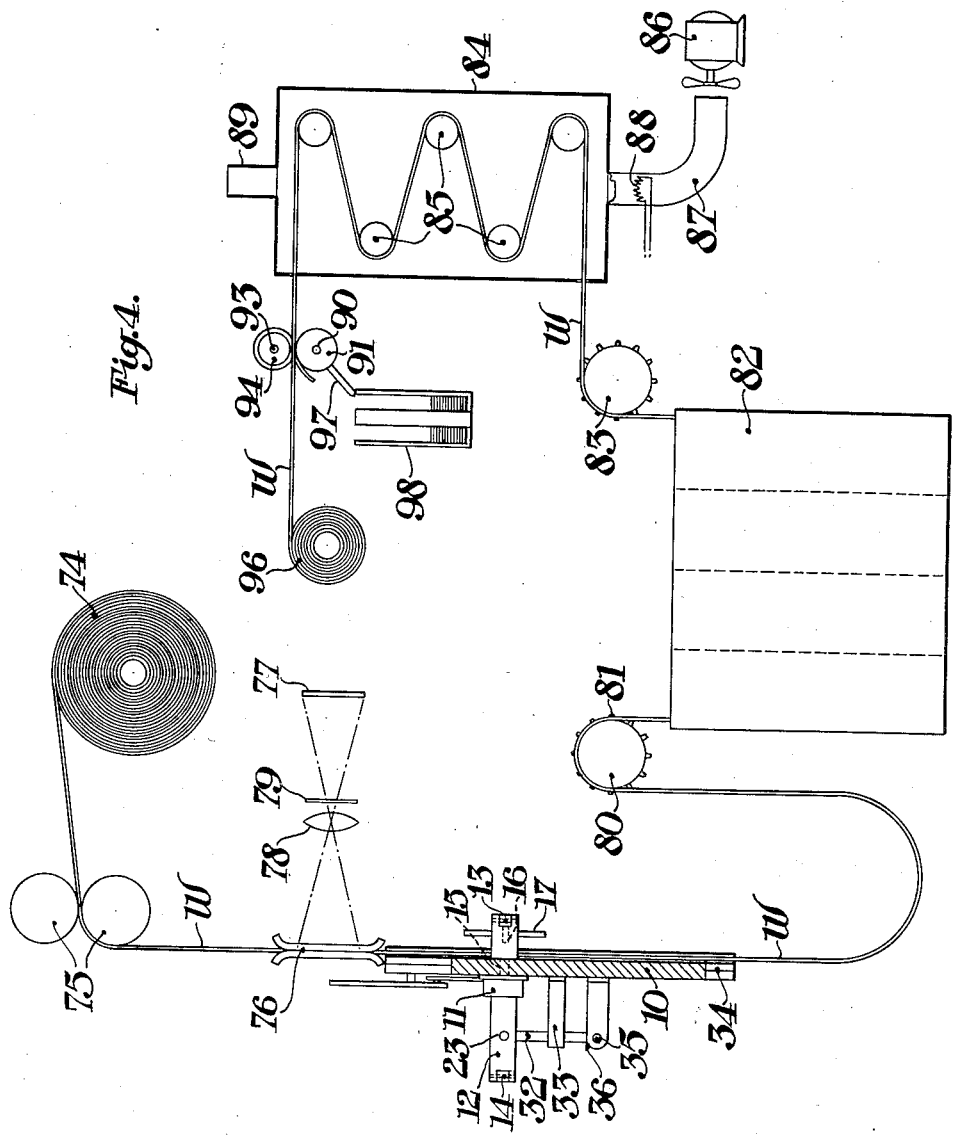

Patented May 8, 1934

1,957,863

UNITED STATES PATENT OFFICE 1,957,863

APPARATUS FOR HANDLING PHOTOGRAPHIC STRIP MATERIAL

Clifton M. Tuttle and William C. Henry, Rochester, N. Y., assignors to Eastman Kodak Company, Rochester, N. Y., a corporation of New York Application November 6, 1931, Serial No. 573,408

16 Claims. (Cl. 95—13)

The present invention relates to an apparatus for handling photographic strip material, and more particularly to an apparatus for completely severing individual picture areas from strip material.

It has recently become desirable to reproduce complete sets of library or catalog cards by photographic means. Several apparatus for automatically presenting the original cards to a photographic apparatus for reproduction are already known. The latent images, however, are created during reproduction upon individual sheets of photographic strip material and it is quite evident that the subsequent processing of such individual sheets in large numbers is very laborious and inconvenient.

The primary object of the present invention is the provision of an apparatus for transversely slotting photographic strip material between picture areas thereon, and subsequently slitting the strip material along the side edges of the picture areas for complete severance thereof from the strip material, the transverse slots in the photographic strip material being at least co-extensive with the width of the picture areas thereon.

Another object of the present invention is the provision of an apparatus for simultaneously providing transverse slots in photographic strip material and intermittently advancing the strip material.

A further object of the present invention is the provision of an apparatus for simultaneously transversely slotting and longitudinally advancing photographic strip material, said transverse slots being provided between latent images on the strip material and the advancement being intermittent past a camera means.

Still another object of the present invention is the provision of an apparatus for providing transverse slots in photographic strip material in combination with a processing apparatus of known form to develop the latent images on the strip material with subsequent slitting of the strip material along the side edges of the picture areas to completely cut the picture areas out of the strip material.

A still further object of the invention is the provision of an apparatus for simultaneously slotting and advancing photographic strip material which includes a plate reciprocated parallel to the strip material, said plate having a carriage reciprocated perpendicularly thereto and supporting a knife which is adapted to penetrate or slot the strip material upon actuation of the carriage during one extreme position of said plate.

Another object of the present invention is the provision of toggle joints in the slotting and advancing apparatus, so that the knife thereof is held in operative position by toggle action.

A further object of the invention is the provision of a spring adapted to maintain the carriage member and knife of the slotting mechanism in retracted position during the idle stroke of a reciprocating plate carrying the carriage member, said spring being overcome by the toggle action in levers actuating the carriage member during operative position of the knife.

Still another object of the present invention is the provision of actuating means for the slotting and advancing apparatus which includes a pair of cams alternately operating the slotting mechanism during extreme positions of the reciprocating plate carrying the slotting mechanism.

With these objects in view, the present invention consists in certain features of novelty in the construction, combination, and arrangement of parts by which the said objects and certain other objects are effected, all as fully described with reference to the accompanying drawings and more particularly pointed out in the appended claims.

Reference is hereby made to the accompanying drawings wherein similar elements are designated by similar reference numerals, and wherein:

Fig. 3 is a plan view of Figure 1, showing the toggle joints and cams for operating the carriage member of the slotting and advancing apparatus.

Fig. 4 illustrates diagrammatically the lay-out of the complete apparatus for slotting, processing, and slitting photographic strip material and includes a cross-section of the slotting and advancing apparatus taken on the line 4—4 of Fig. 3.

Fig. 5 is a perspective view of the slitting apparatus for longitudinally cutting the strip material along the side edges of the picture areas.

Fig. 6 is a perspective view of a modified form in which the photographic strip material may be supplied; that is, the strip material is supplied in rolls and is previously provided with transverse slots of proper extent.

Figure 1:
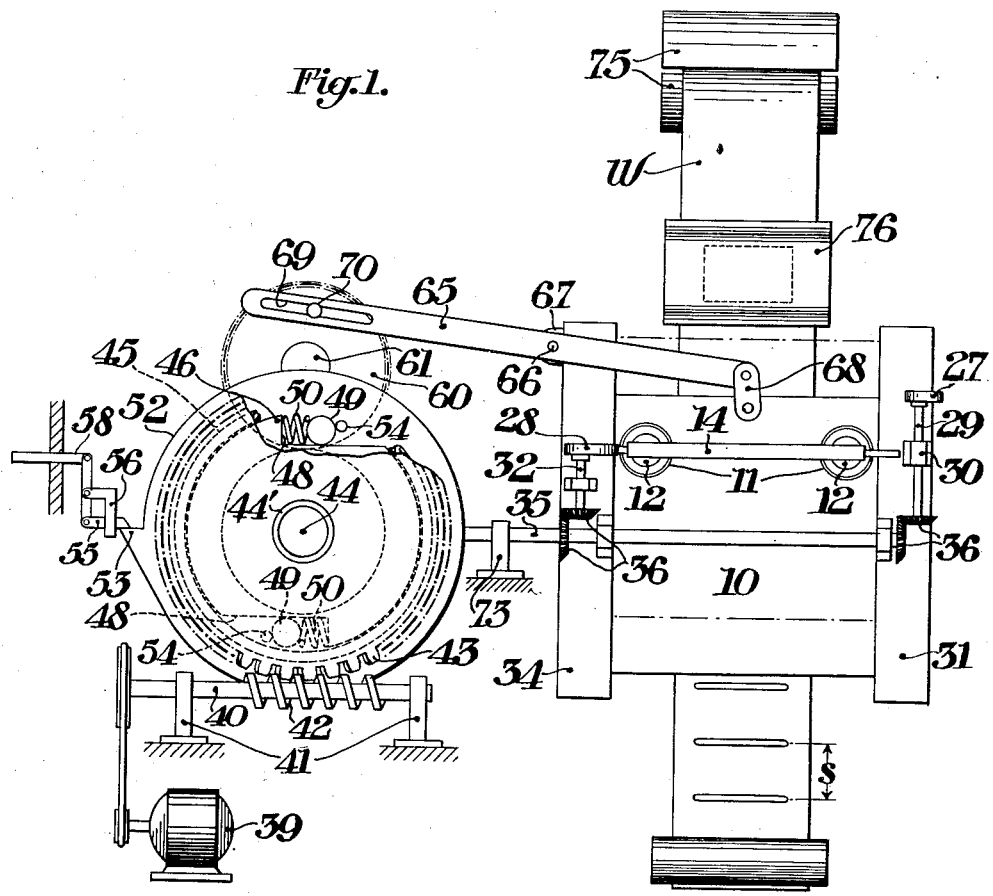
Fig. 1 is a front elevation of the slotting and advancing apparatus according to our invention

In the illustrated embodiment of our invention, a prime mover actuates a reciprocating means for the plate member of the slotting and advancing means, and also actuates the cams which operate the carriage member with respect to the plate member. The slotting and advancing means performs a perforating function which will now be particularly described.

A plate 10 carries two bearing members 11 which register with apertures provided in the plate 10. A carriage member, which is mounted on and perpendicularly slidable with respect to the plate 10, comprises a rectangular frame including slides 12 and end pieces 13 and 14. The plate 10 is provided with an elongated aperture 15 while an elongated knife 16 is carried on the end piece 13 so that upon reciprocation of the carriage member perpendicularly to the plate 10, knife 16 is moved into and out of shearing relation to elongated aperture 15. The photographic strip material W is located adjacent the plate 10 so that upon movement of the knife 16 toward plate 10 the strip material W is penetrated and a transverse slot is provided therein. Gripping means are also located upon end piece 13 on each side of knife 16 and specifically include a pair of cross bars 17 which are serrated on the surface and which abut the strip material W upon movement of the carriage member to operative or perforating position.

The means for reciprocating the carriage member perpendicularly to the plate 10 includes a toggle means between the carriage member and plate 10, and an actuating means to move the carriage member perpendicularly to plate 10. The toggle means comprises two pairs of levers 18 and 19, see Fig. 3. The levers 18 are pivotally connected at one end to supports 20 mounted on the plate 10 and are pivotally connected at the other end to the ends of levers 19 by pins 21. The levers 19 have one end pivotally mounted upon the end member 14 of the carriage member by means of pintles 22 and the other ends of levers 19 are pivotally connected to levers 18 as previously described. A rod 23 is slidably mounted within the slides 12 of the carriage member and is attached to the pins 21 forming the center pivotal connection of the toggle means.

A spring member is included in the toggle means and is of such strength that the rod 23 is normally held in a position in which the knife 16 is retracted from the elongated aperture 15 in plate 10 but, on the other hand, the strength of said spring member is such that it may be overcome by the toggle action in the levers 18 and 19 when the rod 23 has been externally actuated and knife 16 is in shearing relation to the elongated aperture 15 of plate 10. The spring member may be of any suitable construction but has been illustrated as comprising coil spring 24 encircling the rod 23, and having one end abutting a pin 25 in rod 23 while the other end abuts a yoke member 26 mounted upon the end piece 14 of the carriage member.

The actuating means which operates the toggle means for perpendicular movement of the carriage member with respect to plate 10, comprises a cam 27 and an off-set cam 28. The cam 27 is mounted upon the upper end of a shaft 29, said shaft 29 being rotatably mounted in a bracket 30 attached to a guideway 31. The off-set cam 28 is attached to the upper end of a shaft 32 which is mounted in a bracket 33 on a guideway 34. The shafts 29 and 32 are rotated by a drive shaft 35 and through pairs of mitre gears 36, the shaft 35 being rotated by means to be subsequently described. From a consideration of Figure 3 it will be noted that rotation of cam 27, in the direction of the arrow thereon, will move rod 23 to the left until the collar 37 thereon abuts the left slide 12 of the carriage member. In this position of rod 23 the toggle action is present in the levers 18 and 19 and the carriage member has been moved perpendicularly to the plate 10 so that knife 16 is in shearing relation to the elongated aperture 15 and cross bars 17 are in abutting relation to the strip material W.

The carriage member is now in the position indicated by the dotted outline of end piece 14 in Fig. 3; therefore, the cam 28 must be off-set so that it will properly engage the rod 23 in this position. Rotation of off-set cam 28 in the direction indicated by the arrow thereon will move rod 23 to the right until collar 38 abuts the other slide 12 of the carriage member. After the toggle action of levers 18 and 19 has been overcome by axial movement of rod 23, the coil spring 24 will assist the cam 28 in moving rod 23.

The plate is moved up and down by the reciprocating means which will be later described in detail, and for this purpose is provided with rabbeted edges 10' which move within the guideways 31 and 34. The length of the stroke for plate 10 will be equal to the width of a transverse slot plus the distance between two successive slots on the strip material, this stroke being indicated by the dimension S in Figure 1. The cam 27 rotates in a plane above the rotational plane of off-set cam 28, these planes being displaced a vertical distance equal to the dimension S. When the plate 10 has moved to the upper extreme position the rod 23 will be opposite cam 27 and when plate 10 is in the lower extreme position the rod 23 will be opposite off-set cam 28.

The reciprocating means for the plate 10 preferably has a short down-stroke and a relatively long up-stroke with appreciable pauses at each end of the stroke, so that the cams 27 and 28 will have an opportunity to move the rod 23. This reciprocation of plate 10 may be accomplished in any known manner, but is specifically effected in the manner now to be described.

A prime mover such as a motor 39 drives a horizontal shaft 40 which is supported by a pair of bearings 41. The horizontal shaft 40 carries a worm gear 42 which actuates a worm wheel 43 turning loosely upon a main shaft 44, said worm wheel 43 being held on said shaft 44 by a collar 44'. An annular ring 45 is mounted upon or integral with worm wheel 43 and encircles a disc 46 also on the main shaft 44 but which is caused to turn therewith by means of a key 47. The disc 46 is provided in a known manner with diametrically opposite recesses 48, said recesses containing balls 49 pressed by coil springs 50 against the inner peripheral surface of annular ring 45. A cover plate 51 is attached to disc 46 to retain the balls 49 within recesses 48. A plate 52 has a single tooth 53 on the periphery thereof, and is also keyed to main shaft 44 by said key 47. Plate 52 carries a pair of pins 54 which are adapted to pass through slots (not shown) in cover plate 51 and to abut balls 49 to hold the same out of frictional contact with the inner peripheral surface of annular ring 45 against the action of coil springs 50. A detent 55 is slidably mounted in a guide 56, is located so as to engage tooth 53 and has one end thereof connected to a lever 57 adapted to be actuated by a push button 58, see Fig. 1.

The foregoing assembly functions as a single turn clutch in the following manner:

Upon depression of push button 58, detent 55 is retracted and balls 49 are moved by springs 50 to make frictional engagement with the peripheral surface of annular ring 45, causing ring 45 and disc 46 to turn together. In other words, the main shaft 44 is now driven by the motor 39 through the worm gear 42, worm wheel 43, ring 45, balls 49 and disc 46. If the push button 58 is released before plate 52 completes a single revolution, the detent 55 will engage tooth 53 to prevent further rotation of plate 52, whereupon the pins 54 will move the balls 49 away from annular ring 45 and the worm gear 42 will again turn freely upon main shaft 44. If, on the other hand, push button 58 is not released before the completion of a single revolution of plate 52, then the annular ring 45 and disc 46 will continue to rotate together.

Figure 2:
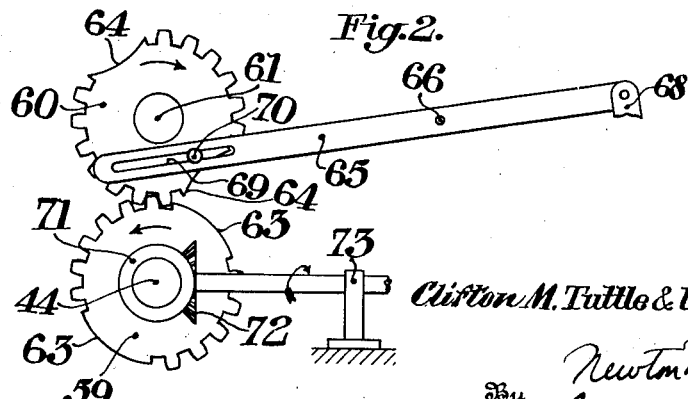
Fig. 2 is a detail of intermittent gears embodied in the reciprocating means for the plate of the slotting and advancing apparatus.

Intermittent gear 59, see Fig. 2, is mounted upon and rotates with main shaft 44. Another intermittent gear 60 is mounted upon and rotates with a counter shaft 61 which is supported by a bearing 62, see Fig. 3. Intermittent gears 59 and 60 are cut in a known manner so that counter shaft 61 will rotate with main shaft 44 for a portion of a single revolution, is stationary for a short time, again rotates with main shaft 44 for another portion of a single revolution, and is again stationary for a short space of time. This intermittent movement is accomplished by the provision of two pitch circle sectors 63 on gear 59 which are adapted to coact with a pair of depressed sectors 64 on intermittent gear 60. It should be noted that there is one more tooth on intermittent gear 60 between the depressed sectors 64 than there is on intermittent gear 59 between the pitch circle sectors 63. This is in accordance with the known method of cutting intermittent gears.

A lever 65 is intermediately pivoted upon a pin 66 mounted in a bracket 67 on guide way 34. One end of lever 65 is connected to plate 10 by a link 68. The other end of lever 65 is provided with an elongated slot 69 which engages a headed stud 70 eccentrically mounted on intermittent gear 60. During the rotation of main shaft 44 from the position shown in Fig. 2, and in the direction of the arrows on gears 59 and 60, lever 65 will be moved to raise plate 10 to the top of its stroke, then the pitch circle sector 63 and the corresponding depressed sector 64 on gear 60 will coact and gear 60 will be made stationary for a short time to provide a pause at the top of the stroke for plate 10 to permit cam 27 to actuate rod 23. Upon further rotation of gear 59, gear 60 will again be turned and lever 65 will be moved by stud 70 to lower the plate 10 a distance equal to the stroke S. The sectors 63 and 64 again coact at the bottom of the stroke to give off-set cam 28 an opportunity to move rod 23 in the opposite direction whereupon the teeth of the intermittent gears 59 and 60 are again engaged to move lever 65 and cause the up-stroke of plate 10. It should be noted that gears 59 and 60 are provided with one more tooth between the sectors on one side so that the plate 10 is given a long up-stroke and a short down-stroke, the pauses at the ends of the stroke being approximately equal to each other. The foregoing description of the intermittent actuating mechanism does not, per se, constitute a part of the present invention and may, of course, be altered or varied in any desired manner to provide a different cycle of movement for the plate 10.

A beveled gear 71 is keyed to main shaft 44 and engages a second beveled gear 72 to rotate drive shaft 35 in the direction indicated by the arrow in Fig. 2. The drive shaft 35 may be supported by a bracket 73. The cam 27 and off-set cam 28 are driven from main shaft 44 only during rotation thereof and only during reciprocation of the plate 10.

The apparatus thus far described constitutes the slotting means or slotting and advancing means as included in the appended claims.

The photographic strip material or web W is preferably provided in a supply roll 74, see Fig. 4, and conducted by the tensioning rolls 75 through a gate 76 to the slotting and advancing means. The gate 76 is constructed in a known manner and presents for exposure a picture area of a desired size on the strip material. A camera means for creating latent photographic images on the light sensitive photographic strip material is located to project an image of the object or library card through a lens 78, the projection of the card image being controlled by a shutter 79 for proper exposure of the light sensitive material to the image.

Although we have illustrated the gate and camera means as acting upon the web W before passage through the slotting and advancing means, it is clearly within the scope of the present invention to locate such camera means opposite the plate 10 or below the lowermost position of the same. Furthermore, it is within the contemplation of our invention that the light sensitive strip material may be supplied in rolls and previously provided with the transverse slots. In other words, the supply roll 74' of strip material shown in Fig. 6 may be substituted for supply roll 74 of Fig. 4. In this event the latent photographic images are created upon the web W between the slots, and the slotting and advancing means now only performs the single function of advancing. The great advantage of providing the strip material with latent images having transverse slots there-between is that said strip material may be more readily processed for development of the latent image. On the other hand, the present invention is also adaptable to the severance of successive picture areas from continuous strip material.

Specifically the web W is conducted in a loop from the slotting and advancing means to a roll 80. The roll 80 is continuously rotated and may be provided with fins 81 which engage the transverse slots in the web W. The provision of the loop in the web material between roll 80 and the slotting and advancing means is to compensate for the discrepancy in the intermittent movement of the slotting and advancing means and the continuous movement of roll 80. The slotted web W is now passed through a processing means which is adapted to develop the latent images on said slotted strip material. Such a processing means for the development of the latent images is merely indicated in the present disclosure as being tank 82, provided with four compartments for the developing, rinsing, fixing, and washing of the strip material.

A drying means may be included in the processing means and is diagrammatically illustrated in Fig. 4 of the drawings. The web W is conducted from tank 82 over a roll 83 which is continuously rotating and provided with fins similarly to roll 80. The web W is conducted through a drying chamber 84 in a serpentine path over a plurality of rolls 85. A blast of warm air is circulated through drying chamber 84 and may be provided by an fan 86 forcing air through an intake 87, over a heating coil 88, through the drying chamber 84, and exhausted through a vent 89.

As the web W leaves the drying chamber, it is passed through a cutting means which is adapted to sever the margins of the strip material from the side edges of the picture areas. The cutting means for slitting the web W along its margins may be constructed in any known manner, and the cutting means here disclosed is merely for purposes of illustration.

The cutting means of the illustrative embodiment is best shown by the perspective view of Fig. 5, and comprises two pairs of rotating discs having beveled cutting edges spaced to trim the side edges of the picture areas. A cutter shaft 90 is adapted to rotate below the web W and carries two beveled cutting discs 91 and 92 in axial spaced relation, the discs 91 and 92 being mounted with the beveled surfaces facing each other and with the flat surfaces spaced at a distance equal to the width of the picture areas. A second cutter shaft 93 is adapted to rotate above the web W and shaft 90, and carries a pair of cutting discs 94 and 95 mounted with the plain sides thereof facing each other and spaced at a distance equal to the width of the picture areas. The pairs of discs 91 and 94, 92 and 95 slightly overlap each other and have the plain surfaces thereof rotating adjacent to or in sliding contact with each other. The cutting means for slitting the web W along the margins may also include a take-up shaft 96 which is adapted to receive the marginal strips of the web W, and which will be effective to draw the web accurately between the cutter discs.

As the web W is drawn between the cutting discs, the individual picture areas will be completely severed from the web and will fall downwardly onto a chute 97 and into a receptacle 98, see Fig. 4.

The complete operation of the apparatus according to our invention will be briefly described hereinafter:

The strip material which is preferably light sensitive and provided in rolls is conducted intermittently past a camera means which creates a latent image upon the light sensitive strip material. The slotting and advancing means will effect the intermittent advancement of the strip material past the camera means and will provide a transverse slot in the strip material between picture areas, said slot being at least co-extensive with the width of the picture areas. The strip material or web W is then continuously passed through a processing means for developing the latent images and for drying the strip material. The final operation is the longitudinal slitting of the strip material or web W to complete the trimming of the picture areas along the side edges thereof.

Although many of the elements of our invention are known, per se, their particular combination as here disclosed and claimed is deemed to be novel, especially in view of the advantageous results achieved. It is apparent that by means of the apparatus of our invention multitudes of library cards may be readily reproduced.

Since many modifications of the apparatus according to our invention are possible, we wish to have it clearly understood that the strip material need not be immediately developed. It is also within the scope of our invention to eliminate the processing apparatus and the drying apparatus, so that the strip material may be slit while wet and the individual picture areas dried separately. The appended claims define the scope of our invention and are intended to include all equivalent apparatus or structures called for therein.

Having now particularly described our invention, what we claim as new and desire to secure by Letters Patent of the United States is:

1. In an apparatus adapted to handle photographic strip material having picture areas thereon, the combination with a slotting means adapted to provide transverse slots in said strip material between the picture areas, of a cutting means adapted to sever the margins of the strip material from the side edges of the picture areas whereby the picture areas are completely cut out of the strip material.

2. In an apparatus adapted to handle photographic strip material having picture areas thereon, the combination with a slotting means adapted to provide transverse slots in said strip material between and at least co-extensive with said picture areas, of a cutting means adapted to cut across the ends of said transverse slots and to sever the margins of the strip material from the side edges of the picture areas whereby the picture areas are completely cut out of the strip material.

3. In an apparatus adapted to handle photographic strip material having picture areas thereon, the combination with a slotting and advancing means adapted to provide transverse slots in said strip material between the picture areas and to advance the strip material, of a cutting means adapted to sever the margins of the strip material from the side edges of the picture areas.

4. In a photographic recording apparatus adapted to use light sensitive strip materials, the combination with a camera means for creating successive latent photographic images on said light sensitive material, and slotting means adapted to provide transverse slots in said strip materials between said latent images, of a cutting means adapted to sever the margins of the strip material from the side edges of the image areas.

5. In a photographic recording apparatus adapted to use light sensitive strip material, the combination with a camera means for creating successive latent photographic images on said light sensitive material and slotting means adapted to provide transverse slots in said strip material between said latent images, of a processing means adapted to develop the latent images on said slotted strip material, and cutting means adapted to sever the margins of the strip material from the side edges of the patent image areas.

6. In a photographic recording apparatus adapted to use light sensitive strip material, the combination with a camera means for creating successive latent photographic images on said light sensitive material, and slotting and advancing means adapted to provide transverse slots in said strip material between said latent images and to advance said strip material intermittently past said camera means, of a processing means adapted to develop the latent images on said slotted strip material and cutting means adapted to sever the margins of the strip material from the side edges of the patent image areas.

7. In a photographic recording apparatus adapted to use photographic strip material, the combination with a camera means for creating successive latent photographic images on said strip material, of slotting and advancing means comprising a plate adapted to be adjacent said strip material and provided with an aperture, a carriage member mounted on and perpendicularly slidable with respect to said plate, a knife mounted on said carriage member and adapted to enter the aperture in said plate in shearing relation thereto and means for reciprocating said carriage member perpendicularly to said plate.

8. In a photographic recording apparatus adapted to use photographic strip material, the combination with a camera means for creating successive latent photographic images on said strip material, of slotting and advancing means comprising a plate adapted to be adjacent said strip material and provided with an aperture, a carriage member mounted on and perpendicularly slidable with respect to said plate, a knife mounted on said carriage member and adapted to enter the aperture in said plate in shearing relation thereto, a toggle means between said plate and said carriage member and actuating means operating said toggle means to move said carriage member perpendicularly to said plate.

9. In a photographic recording apparatus adapted to use photographic strip material, the combination with a camera means for creating successive latent photographic images on said strip material, of slotting and advancing means comprising a plate adapted to be adjacent said strip material and provided with an aperture, a carriage member mounted on and perpendicularly slidable to said plate, a knife mounted on said carriage member and adapted to enter the aperture of said plate in shearing relation thereto, gripping means on said carriage member adapted to hold said strip material against said plate and means for reciprocating said carriage member perpendicularly to said plate and for moving said knife to penetrate said strip material and the gripping means to hold the same against the plate.

10. In a photographic recording apparatus adapted to use photographic strip material, the combination with a camera means for creating successive latent photographic images on said strip material, of slotting and advancing means comprising a plate having the surface thereof adapted to be adjacent the surface of said strip material and provided with an aperture, a carriage member mounted on and perpendicularly slidable to said plate, a knife mounted on said carriage member and adapted to enter the aperture of said plate in shearing relation thereto and means for reciprocating said carriage member perpendicularly to said plate and for moving said knife to penetrate said strip material.

11. In a photographic recording apparatus adapted to use photographic strip material, the combination with a camera means for creating successive latent photographic images on said strip material of slotting and advancing means comprising a plate adapted to be adjacent to said strip material and provided with an aperture, a carriage member mounted on and perpendicularly slidable to said plate, a knife mounted on said carriage member and adapted to enter the aperture in said plate in shearing relation thereto, a pair of levers pivotally connected to each other and between said plate and carriage members to form a toggle joint, a rod slidably mounted in said carriage member and attached to the pivotal connection between said lever, and a cam located adjacent each end of said rod and adapted to alternately actuate said rod whereby the carriage member is moved perpendicularly to said plate.

12. In a photographic recording apparatus adapted to use photographic strip material, the combination with a camera means for creating successive latent photographic images on said strip material, of slotting and advancing means comprising a plate adapted to be adjacent said strip material and provided with an aperture, a carriage member mounted on and perpendicularly slidable to said plate, a knife mounted on said carriage member and adapted to enter the aperture in said plate in shearing relation thereto, a pair of levers pivotally connected to each other and between said plate and carriage member to form a toggle joint, a rod slidably mounted in said carriage member and attached to the pivotal connection between said levers, a spring member normally holding said rod in a position in which said knife is retracted from the apertures in the plate and adapted to be overcome by the toggle action in said levers, and a cam located adjacent each end of said rod, and adapted to alternately actuate said rod whereby the carriage member is moved perpendicularly to said plate.

13. In a perforating and advancing apparatus adapted to perforate and advance photographic strip material, the combination with a plate slidably mounted and adapted to be adjacent said strip material and reciprocating means adapted to move said plate parallel to said strip material, of a carriage member mounted on and perpendicularly slidable to said plate, a knife mounted on said carriage member and adapted to register with the aperture in said plate and means for moving said carriage member when said plate is in its extreme positions whereby the strip material is advanced and slotted at intervals equal to the stroke of the reciprocating means for the plate.

14. In a perforating and advancing apparatus adapted to perforate and advance photographic strip material, the combination with a plate slidably mounted, provided with an elongated transverse aperture and adapted to move adjacent said strip material and reciprocating means adapted to move said plate parallel to said strip material, of a carriage member mounted on and perpendicularly slidable to said plate, an elongated knife mounted on said carriage member and adapted to move into shearing relation with respect to the elongated aperture in said plate transversely to said strip material, a toggle means between said plate and said carriage member and actuating means operating said toggle means to move said carriage member perpendicularly to said plate.

15. In a perforating and advancing apparatus adapted to perforate and advance photographic strip material, the combination with a plate slidably mounted and adapted to be adjacent said strip material and reciprocating means adapted to move said plate parallel to said strip material and between extreme positions, of a carriage member mounted on and perpendicularly slidable to said plate, a knife mounted on said carriage member adapted to register with the aperture in said plate at one extreme position of the carriage member and to be located transversely to the strip material and means for moving said carriage member into the extreme positions thereof at the corresponding extreme positions of the plate.

16. In a perforating and advancing apparatus adapted to perforate and advance photographic strip material, the combination with a plate adapted to be reciprocated adjacent to said strip material, a carriage member mounted on and perpendicularly slidable with respect to said plate, means for reciprocating said plate and a second means for reciprocating said carriage member perpendicularly to said plate, of a prime mover for simultaneously actuating both of said means for reciprocating the plate and the carriage member.

CLIFTON M. TUTTLE.
WILLIAM C. HENRY.